OR  3,923,372

United States

Roland

[11] 3,923,372
[45] Dec. 2, 1975

[54] FIBER OPTIC EXTRA ORAL OPERATORY LIGHT

[75] Inventor: Max Roland, Redwood City, Calif.

[73] Assignee: MDT Instrument Company, Gardena, Calif.

[22] Filed: Jan. 4, 1974

[21] Appl. No.: 430,759

Related U.S. Application Data

[63] Continuation-in-part of Ser. No. 204,995, Dec. 6, 1971, abandoned.

[52] U.S. Cl............. 350/96 B; 240/1.4; 240/41.15
[51] Int. Cl.²........................................ G02B 5/16
[58] Field of Search.......... 350/96 B; 240/1.4, 41.15

[56] References Cited
UNITED STATES PATENTS

| | | | |
|---|---|---|---|
| 1,782,906 | 11/1930 | Newman | 350/96 R X |
| 3,050,907 | 8/1962 | Hicks et al. | 350/96 B X |
| 3,357,423 | 12/1967 | Winchester et al. | 350/96 B X |

Primary Examiner—David H. Rubin
Attorney, Agent, or Firm—Trask & Britt

[57] ABSTRACT

A fiber optic, extra oral, operatory light is constructed with a fiber optic bundle loosely stuffed in a conduit comprised of spaced-apart, relatively long, rigid members connected by relatively short, flexible members. One end of the conduit comprises a window. The corresponding end of the bundle is exposed through this window to a light source contained in a housing through a fitting which permits the window to move in an arc around the light source without distorting the bundle or the configuration of the conduit. This construction avoids the "memory" problem normally associated with flexible light pipe arrangements by accomodating gross movements of the distal (lens-carrying) end of the operatory light without involving the fiber bundle.

7 Claims, 4 Drawing Figures

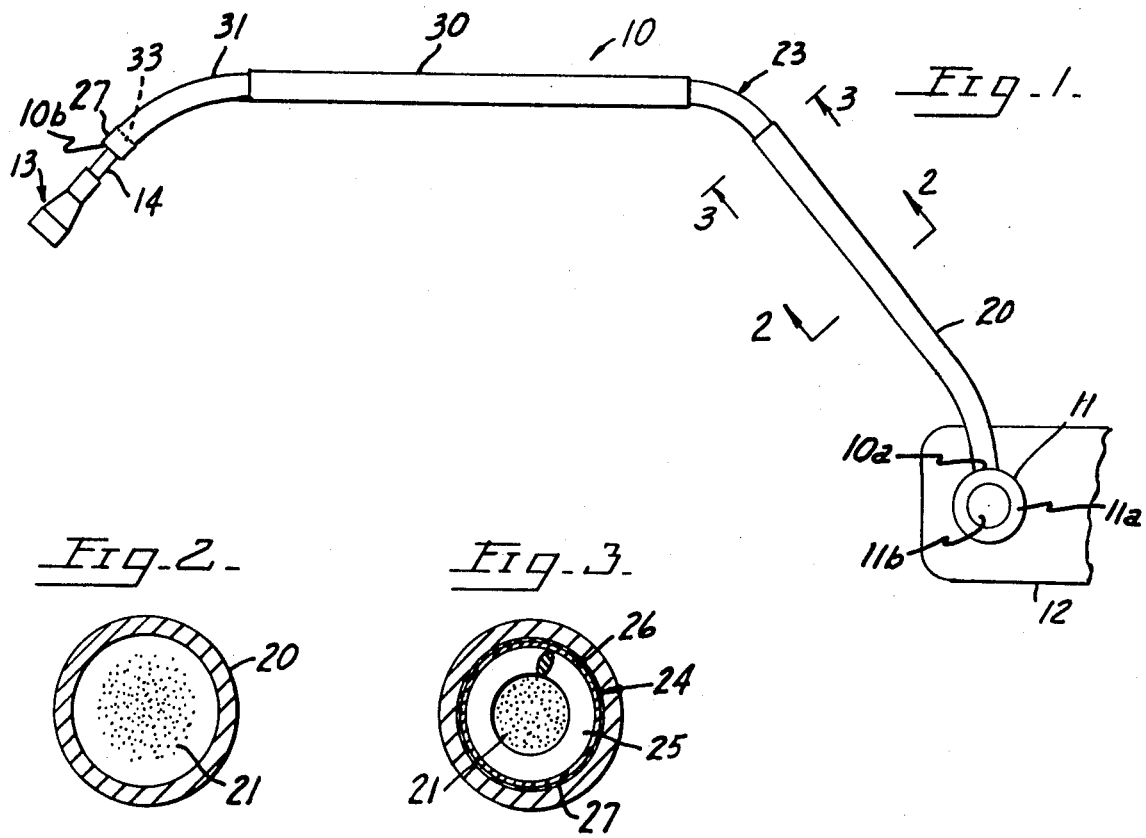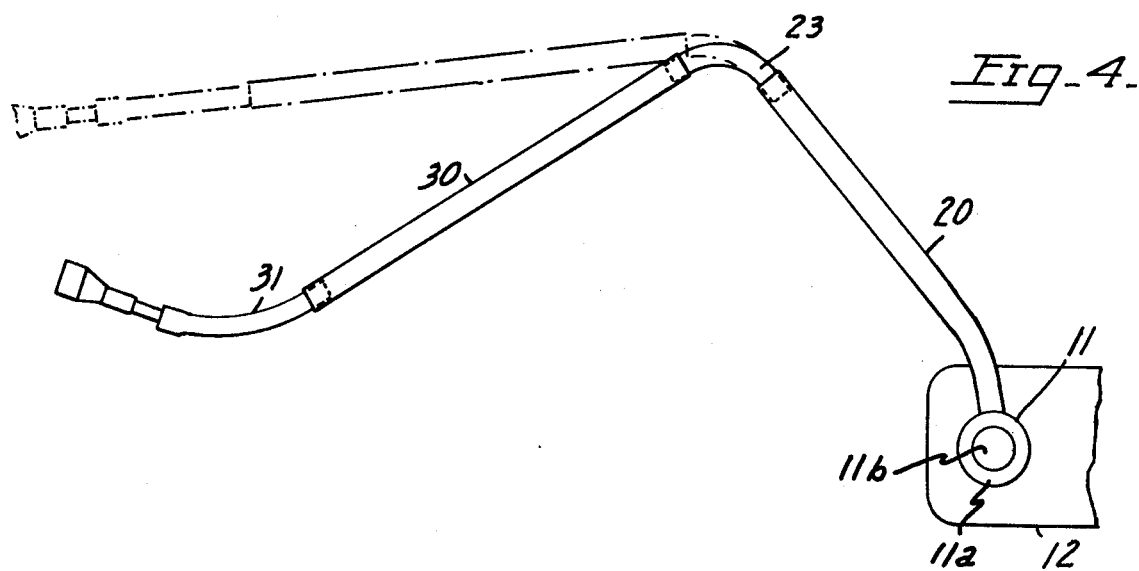

FIBER OPTIC EXTRA ORAL OPERATORY LIGHT

RELATED APPLICATIONS

This application is a continuation-in-part of commonly-assigned, copending patent application Ser. No. 204,995, filed Dec. 6, 1971, and now abandoned.

BACKGROUND OF THE INVENTION

This invention relates to fiber optic operatory lights of the type in which a bundle of a large number of elongated, light-transmitting fibers in side by side relationship is employed to transmit light from a light source to a point spaced a considerable distance from the source. Because the light emitted from a fiber optic bundle is cool, lights constructed from them have found use in surgery and dentistry. Examples of prior types of fiber optic lights are shown in U.S. Pat. Nos. 3,010,357; 3,050,907; 3,068,739; 3,327,712; 3,327,712; and 3,397,457.

In previous devices, the fiber optic bundle has been fixedly secured at its proximal end to a housing containing a light source which is directed at said proximal end. The bundle has been contained within a conduit or pipe for housing and protecting the fibers. The distal end of the conduit carries a lens or other fixture adapted to transmit light carried by the fiber bundle. The conduit is often entirely rigid, but it may be articulated (e.g., flexible) to permit manipulation of its distal end to various positions and at various angles to accomodate to the particular position of the object to be illuminated. Heretofore, such articulated conduits have been flexible along the major portion of their lengths. A typical flexible conduit comprises an armored sheathing known in the electrical art as "BX" and commonly employed as a covering for electric wires. Such flexible conduits, in order to protect the elements contained therein while at the same time permitting the desired flexibility, have necessarily been relatively heavy. Accordingly, when the fiber optic bundle is fairly long, the flexible conduit containing it tends to sag from its own weight. The bundle of fibers is of considerable weight itself, thus aggravating this problem. In addition, both the flexible conduit (because of its construction) and the fibers themselves exhibit considerable memory and tend, when bent along their axes, to readjust their orientations to a "remembered" (i.e., previous stable, axial) position. In other words, although certain flexible operatory lights of the prior art are capable of being placed in about any desired position, it has generally been necessary for the user or his assistant to hold them in that position. Otherwise, the lens of the light tends to be carried away by the conduit as it shifts position in response to sagging and/or memory phenomena.

SUMMARY OF THE INVENTION

The present invention provides an operatory light constructed to avoid the problems inherent in the prior art devices. The devices of this invention include a flexible arm of special construction. The arm loosely houses a fiber optic bundle and carries a conventional lens or other light fixture at its distal end. The proximal end of the arm constitutes window means for introducing light from a source into the proximal end of the bundle. An important aspect of this invention is coupling the proximal end of the arm to the light source through means which hold the window in position to receive light while at the same time permitting the window and the proximal end of the bundle to move in an arc around the source. Various known types of fittings can be used for this purpose, although a cylindrical fitting which permits substantially 360° rotation of the arm around the light is presently preferred.

The flexible arm is preferably constructed with the fiber optic bundle strung through a segmented conduit, with alternate rigid and flexible segments. The rigid segments are significantly lighter per unit length than are the flexible segments, and the overall length of the conduit is comprised in major part of rigid segments. The length of the flexible segments is limited, within practical limits, to that required to accomodate a substantial bend. In this fashion, the weight carried by the flexible segments is minimized, as is the portion of the arm which tends to move spontaneously in response to the memory of the fiber optic bundle (and/or the flexible portion of the conduit). Of course, the degree to which any flexible segment must be bent to place the lens in a desired position is considerably reduced because of the motion of the proximal end of the arm permitted by the coupling means hereinbefore described.

BRIEF DESCRIPTION OF THE DRAWINGS

In the drawings, which describe what is presently regarded as the best mode for carrying out the invention.

FIG. 1 is a side elevation of an operatory light of this invention;

FIG. 2 is a greatly enlarged cross sectional view taken in a plane indicated by the line 2—2 in FIG. 1;

FIG. 3 is a similar view taken in a plane indicated by the line 3—3 of FIG. 1; and FIG. 4 is a view similar to FIG. 1 showing schematically some of the positions which the articulated arm may take.

DESCRIPTION OF THE ILLUSTRATED EMBODIMENT

As illustrated by FIG. 1, an adjustable arm generally designated 10, is connected at its proximal end 10a to a cylindrical fitting 11. This fitting 11 secures the arm 10 to a head 12 which includes a source of light (not shown).

The distal end 10i of the arm 10 carries a suitable fixture 13 for dispersing the emitted light on the object to be illuminated. This fixture 13 is attached to a sleeve 14 which functions as the terminus of a "light pipe" in that a bundle of fibers strung through the arm (see FIGS. 2 and 3) is compressed within said sleeve with the ends of the fibers cut off (for example, by a grinding wheel) to provide a planar light emitting surface. A similar sleeve (not shown) is employed at the opposite end 10a of the arm 10 in a position coaxial with a cylindrical fitting 11 to function as a window; i.e., to pick up light from the light source in head 12. These end fittings are not disclosed herein in detail because their specific structures form no part of the present invention.

Fixedly secured within an outer segment 11a of cylindrical fitting 11 is one end of an elongated, rigid tubular member 20, preferably of a lightweight material such as polished aluminum. As best seen in FIG. 2 the glass fibers 21 are relatively loosely packed in member 20 because of the relatively large inner diameter of the latter.

The end of tube 20 opposite fitting 11 is connected to a relatively short length 23 of flexible conduit 24. Such flexible conduit 24 may comprise a length of armored sheathing known as BX and consisting of an inner helically wound wire 25 and an outer helically wound flat strip 26. As shown, the BX is covered by a flexible tubular plastic 27 which may be heat shrunk on the BX.

To connect the conduit 23 to the rigid tube 20, a short portion at the end of said conduit may be inserted in the adjacent end of tube 20 and the latter crimped or swaged slightly inward to obtain a tight, permanent fit.

The end of flexible conduit 23 opposite the rigid tube 20 is connected in a similar manner to one end of another length 30 of rigid tubing similar to member 20 and through which the bundle of fibers continues to another relatively short segment 31 of flexible conduit similar to flexible conduit 23. The free end of segment 31 is provided with an enlarged diameter tubular extension 33 of sleeve 14, and the tubular plastic 27 may extend far enough to cover this extension 33, as shown in FIG. 1.

As emphasized hereinbefore, the major portion of the length of the arm 10 is composed of relatively lightweight, rigid, tubular material forming the long segments 20, 30. Moreover, the total weight of the arm is much less than if it were constructed entirely of the heavier flexible conduit. These two features combine to minimize undesirable sagging of the arm from a particular position in which it is placed. Furthermore, the fact that said tubular members have a relatively large inside diameter permits the bundle of fibers to be placed in the arm so that the total length of each fiber is greater than it would be if restricted to the interior of a relatively smaller inside diameter conduit. This excess of fiber length permits flexing of the fibers in response to movement of the arm to various positions, such as those indicated schematically in FIG. 4. In this manner the fibers themselves impose no restriction on the movement of the arm 10 to various positions, nor are they deformed from their positions of memory to a degree that they would tend to force the arm to move from a set position to a remembered position.

Typically, the articulated arms contemplated by this invention are constructed of flexible conduit along less than one-fourth their total length. As an example of an arm which gives good results for dental use, the tubes 20, 30 each may be about 12 inch long and the flexible conduits 23, 31 about 2½inch and 4½inch respectively.

Flexible segments 23, 31, although permitting flexibility, also have a certain amount of frictional resistance to bending, thus enhancing the tendency for the arm 10 to stay in whatever position it is set. Because the flexible segments 23, 31 are relatively short, they contribute relatively little to the overall weight of the arm and can be selected to exhibit much greater frictional resistance than would be tolerable were the entire arm constructed of such material. Both the minimal length and maximized resistance of the flexible segments counter the memory phenomenon inherent in flexible conduit of the illustrated type.

The segment 11a of fitting 11 turns around the segment 11b as the arm segment 20 is moved clockwise or counterclockwise. In this fashion, the entire arm 10 may be pivoted around the central segment 11b of the fitting 11 without creating any distortion of the arm 10 or the fibers 21 contained therein. The window portion of the bundle receives light in all positions of the arm 10. This system of connection of the arm to the light source also contributes greatly to the ease of positioning the lens 13.

Reference herein to details of the illustrated embodiment should not be taken as a limitation on the scope of the appended claims which themselves recite those features regarded as essential to the invention.

I claim:

1. An extra oral operatory light comprising:
    a fiber optic bundle with a proximal end connected to a housing and adapted to receive light from a light source within said housing, and a distal end connected to a light fixture and adapted to transmit light to said light fixture;
    a conduit, housing said fiber optic bundle, including a first, relatively short, flexible segment with a distal end connected to said light fixture, a second relatively long, rigid segment with a proximal end connected to said housing, and alternate relatively long, rigid segments and relatively short, flexible segments between said first and second segments, each of said rigid segments being lighter in weight per unit length than said flexible segments; and
    a coupling constituting means for connecting the proximal end of said second segment to said housing and structured to permit movement of the proximal end of said bundle in an arc around said light source without distorting the bundle.

2. An operatory light according to claim 1 wherein said coupling comprises a first stationary element and a second element mounted to turn about said first element, said second element being connected to the proximal end of said second segment of said conduit.

3. An operatory light according to claim 1 wherein said flexible segments are of helically wound metallic material so as to exhibit inherent frictional resistance to flexing.

4. An operatory light according to claim 3 wherein said flexible segments comprise less than one-fourth the total length of said conduit.

5. An operatory light according to claim 4 wherein said fiber optic bundle is longer than said conduit and is loosely stuffed within said conduit with its proximal end compressed in a first sleeve contained within said coupling and its distal end compressed in a second sleeve connecting said first segment to said light fixture.

6. In a fiber optic, extra oral operatory light including a fiber optic bundle in a conduit connected to a light source at one end and a light-dispensing fixture at its other end, the improvement which comprises:
    providing said conduit in alternating rigid and flexible segments wherein the total length of the flexible segments is less than one-fourth the total length of the conduit and the weight per unit length of the rigid segments is less than that of the flexible segments.

7. The improvement of claim 6 wherein said conduit includes a first proximal rigid segment adapted for connecting to a light source, a second flexible segment extending from attachment to said first segment, a third rigid segment extending from attachment to said second segment, and a fourth distal flexible segment extending from attachment to said third segment and carrying a light fixture at its distal end.

* * * * *

REEXAMINATION CERTIFICATE (606th)
United States Patent [19]
Roland

[11] B1 3,923,372
[45] Certificate Issued Dec. 30, 1986

[54] FIBER OPTIC EXTRA ORAL OPERATORY LIGHT

[75] Inventor: Max Roland, Redwood City, Calif.

[73] Assignee: MDT Instrument Company, Gardena, Calif.

Reexamination Request:
No. 90/000,862, Sep. 18, 1985

Reexamination Certificate for:
Patent No.: 3,923,372
Issued: Dec. 2, 1975
Appl. No.: 430,759
Filed: Jan. 4, 1974

Related U.S. Application Data

[63] Continuation-in-part of Ser. No. 204,995, Dec. 6, 1971, abandoned.

[51] Int. Cl.⁴ .............................................. G02B 6/04
[52] U.S. Cl. .................................. 350/96.24; 362/32
[58] Field of Search .............. 350/96.24, 96.25, 96.26; 362/32; 433/25

[56] References Cited
U.S. PATENT DOCUMENTS

D. 159,875  8/1950  Versen .................................. D26/62
1,782,906  11/1930  Newman ............................... 128/398
3,050,907   8/1962  Hicks et al. ............................. 65/24
3,357,423  12/1967  Winchester et al. .................. 128/23

FOREIGN PATENT DOCUMENTS

54223  6/1911  Switzerland .

OTHER PUBLICATIONS

Publication marked Ex. F-10054 (2 pages); Ex. C-10032 (4 pages); Ex. D-10048 (2 pages); Ex. E-10049 (2 pages-) -pre 1/4/73 publication admitted by patent owner.

*Primary Examiner*—John D. Lee

[57] ABSTRACT

A fiber optic, extra oral, operatory light is constructed with a fiber optic bundle loosely stuffed in a conduit comprised of spaced-apart, relatively long, rigid members connected by relatively short, flexible members. One end of the conduit comprises a window. The corresponding end of the bundle is exposed through this window to a light source contained in a housing through a fitting which permits the window to move in an arc around the light source without distorting the bundle or the configuration of the conduit. This construction avoids the "memory" problem normally associated with flexible light pipe arrangements by accomodating gross movements of the distal (lens-carrying) end of the operatory light without involving the fiber bundle.

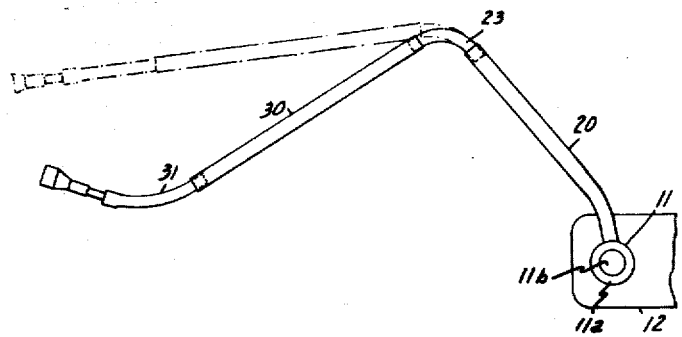

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

New claims 8-21 are added and determined to be patentable.

*8. An operatory light according to claim 1 wherein said flexible segments comprise less than one-half the total length of said conduit.*

*9. An operatory light according to claim 8 wherein said fiber optic bundle is longer than said conduit, and is loosely stuffed within said conduit.*

*10. An operatory light according to claim 1 wherein said proximal end of said fiber bundle is compressed to form a terminus coaxial with said coupling, said terminus constituting means for receiving light from said light source as the proximal end of said conduit is moved to accommodate the movement of the distal end of said conduit.*

*11. An operatory light according to claim 10 wherein said coupling comprises a first stationary element and a second element mounted to turn about said first element, said second element being connected to the proximal end of said second segment of said conduit.*

*12. An operatory light according to claim 11 wherein said flexible segments are of helically wound metallic material so as to exhibit inherent frictional resistance to flexing.*

*13. An operatory light according to claim 12 wherein said flexible segments comprise less than one-half the total length of said conduit.*

*14. An operatory light according to claim 13 wherein said flexible segments comprise less than one-fourth the total length of said conduit.*

*15. An operatory light according to claim 13 or 14 wherein said fiber optic bundle is longer than said conduit and is loosely stuffed within said conduit with its proximal end compressed in a first sleeve contained within said coupling and its distal end compressed in a second sleeve connecting said first segment to said light fixture.*

*16. An extra oral operatory light comprising:*

*a fiber optic bundle with a proximal end connected to a housing and adapted to receive light from a light source within said housing, and a distal end connected to a light fixture and adapted to transmit light to said light fixture;*

*a conduit, housing said fiber optic bundle, including a first, relatively short, flexible segment with a distal end connected to said light fixture, a second relatively long, rigid segment with a proximal end connected to said housing, and alternate relatively long, rigid segments and relatively short, flexible segments between said first and second segments, each of said rigid segments being lighter in weight per unit length than said flexible segments;*

*a coupling constituting means for connecting the proximal end of said second segment to said housing and structured to permit movement of the proximal end of said bundle in an arc around said light source;*

*said conduit and coupling together comprising an articulated light pipe which permits optimum movement of said distal end without impressing excessive strain on individual fibers contained within said bundle.*

*17. An operatory light according to claim 16 wherein said coupling comprises a first stationary element and a second element mounted to turn about said first element, said second element being connected to the proximal end of said second segment of said conduit.*

*18. An operatory light according to claim 16 wherein said flexible segments are helically wound metallic material so as to exhibit inherent frictional resistance to flexing.*

*19. An operatory light according to claim 18 wherein said flexible segments comprise less than one-half the total length of said conduit.*

*20. An operatory light according to claim 19 wherein said flexible segments comprise less than one-fourth the total length of said conduit.*

*21. An operatory light according to claim 19 or 20 wherein said fiber optic bundle is longer than said conduit and is loosely stuffed within said conduit with its proximal end compressed in a first sleeve contained within said coupling and its distal end compressed in a second sleeve connecting said first segment to said light fixture.*

* * * * *